US010819395B1

(12) United States Patent
Molitor et al.

(10) Patent No.: US 10,819,395 B1
(45) Date of Patent: Oct. 27, 2020

(54) INDUCTANCE POWERED PACKAGING TO CONFIGURE A DEVICE

(71) Applicant: Amazon Technologies, Inc., Seattle, WA (US)

(72) Inventors: Eric Michael Molitor, London (GB); Jonathan Bates, London (GB); Lars C. Ulness, London (GB)

(73) Assignee: Amazon Technologies, Inc., Seattle, WA (US)

( * ) Notice: Subject to any disclaimer, the term of this patent is extended or adjusted under 35 U.S.C. 154(b) by 364 days.

(21) Appl. No.: 15/887,768

(22) Filed: Feb. 2, 2018

Related U.S. Application Data

(62) Division of application No. 14/495,646, filed on Sep. 24, 2014, now abandoned.

(51) Int. Cl.
*H04B 5/00* (2006.01)
*H04W 4/80* (2018.01)
*G06F 3/0481* (2013.01)
*G06F 3/0484* (2013.01)

(52) U.S. Cl.
CPC ........ *H04B 5/0062* (2013.01); *G06F 3/0484* (2013.01); *G06F 3/04817* (2013.01); *H04B 5/0037* (2013.01); *H04W 4/80* (2018.02)

(58) Field of Classification Search
CPC ..... H04B 5/0062; H04B 5/0037; H04W 4/80; G06F 3/04817; G06F 3/0484
USPC ...................................................... 340/10.51
See application file for complete search history.

(56) References Cited

U.S. PATENT DOCUMENTS

| | | |
|---|---|---|
| 6,177,860 B1 | 1/2001 | Cromer et al. |
| 6,778,096 B1 | 8/2004 | Ward et al. |
| 7,106,175 B2 | 9/2006 | Lewis |
| 7,407,099 B1 | 8/2008 | Bhatti et al. |
| 7,825,776 B2 | 11/2010 | Smith et al. |
| 8,671,171 B2 | 3/2014 | Skalsky |
| 8,718,554 B2 | 5/2014 | Abel |
| 8,830,661 B2 * | 9/2014 | Yamazaki .............. G11C 5/063 361/679.01 |
| 9,159,013 B2 | 10/2015 | Zhao et al. |
| 9,392,103 B2 | 7/2016 | Maguire et al. |
| 2003/0018751 A1 * | 1/2003 | Lee ........................ G06F 21/10 709/219 |
| 2004/0222300 A1 | 11/2004 | Strickland |
| 2006/0187080 A1 | 8/2006 | Slatter |
| 2006/0208903 A1 | 9/2006 | Loh et al. |
| 2007/0103291 A1 | 5/2007 | Adams |

(Continued)

OTHER PUBLICATIONS

Office action for U.S. Appl. No. 14/495,646, dated Nov. 18, 2016, Molitor et al., "Inductance Powered Packaging to Configure a Device", 14 pages.

(Continued)

*Primary Examiner* — Ojiako K Nwugo
(74) *Attorney, Agent, or Firm* — Lee & Hayes, P.C.

(57) ABSTRACT

Techniques for facilitating the configuration of a device through inductance power transfer are described. In some instances, a device that is packaged for shipment may be associated with an induction coil. The induction coil may be disposed within a package or otherwise arranged. The device may be temporarily powered via the induction coil to receive content wirelessly and store the content on the device. The content may be associated with a user to which the package will be shipped.

20 Claims, 9 Drawing Sheets

(56) References Cited

U.S. PATENT DOCUMENTS

| | | | |
|---|---|---|---|
| 2007/0135112 A1 | 6/2007 | Lessing | |
| 2009/0093272 A1 | 4/2009 | Saarisalo et al. | |
| 2009/0121676 A1* | 5/2009 | Wu | H02J 7/025 |
| | | | 320/108 |
| 2010/0156639 A1* | 6/2010 | Herwig | G06K 19/0723 |
| | | | 340/572.1 |
| 2010/0218465 A1 | 9/2010 | Takaya | |
| 2011/0176263 A1* | 7/2011 | Yamazaki | G11C 5/063 |
| | | | 361/679.01 |
| 2012/0262281 A1 | 10/2012 | Edwards et al. | |
| 2012/0274270 A1* | 11/2012 | Dinsmoor | A61N 1/3787 |
| | | | 320/108 |
| 2013/0031350 A1 | 1/2013 | Thielen et al. | |
| 2013/0197944 A1* | 8/2013 | Drew | A61B 5/0006 |
| | | | 705/3 |
| 2014/0028252 A1* | 1/2014 | Vuori | H02J 50/40 |
| | | | 320/108 |
| 2014/0191846 A1* | 7/2014 | Zhao | G06K 19/0723 |
| | | | 340/10.1 |
| 2014/0370818 A1* | 12/2014 | Luna | H04W 8/005 |
| | | | 455/41.3 |
| 2015/0019376 A1* | 1/2015 | Huang | G06Q 30/0603 |
| | | | 705/26.35 |
| 2015/0058147 A1* | 2/2015 | Roh | G06F 21/10 |
| | | | 705/26.1 |
| 2015/0076917 A1* | 3/2015 | Leabman | H02J 5/005 |
| | | | 307/104 |

OTHER PUBLICATIONS

Office action for U.S. Appl. No. 14/495,646, dated Nov. 3, 2017 Molitor et al., "Inductance Powered Packaging to Configure a Device", 13 pages.

Office action for U.S. Appl. No. 14/495,646, dated Jun. 2, 2017 Molitor et al., "Inductance Powered Packaging to Configure a Device", 14 pages.

U.S. Appl. No. 14/031,957, filed Sep. 19, 2013, Menashe Haskin; John Kelly Cornell; Paul Grady Russell, "Device Packaging." 61 pages.

* cited by examiner

INTERFACE 702

Welcome to your new tablet!

We have associated your content with your tablet.

704 —  The Vampire Hunter by John Smith

706 —  Song A – The Boy Band

708 —  The Real Seattle (Documentary)

710 —  Photo Album – Trip to New York

712 —  Maps App

INDUCTANCE POWERED PACKAGING TO CONFIGURE A DEVICE

RELATED APPLICATIONS

This application claims priority to and is a divisional of U.S. patent application Ser. No. 14/495,646, filed on Sep. 24, 2014, the entire contents of which are incorporated herein by reference.

BACKGROUND

Many users customize their devices with content upon purchasing the devices. Some users download music, videos, games and software updates to their devices, while others adjust settings, user preferences and other information. By doing so, a newly purchased device may be personalized for a particular user that will be using the device. In some instances, a user transfers data from a previously owned device to a newly purchased device. The user may save data to a storage device and connect to the storage device to download the data to the newly purchased device. As a growing number of devices are being purchased, and an increasing amount of content is being downloaded, users are spending increasing amounts of time configuring their newly purchased devices.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

Figure 1:
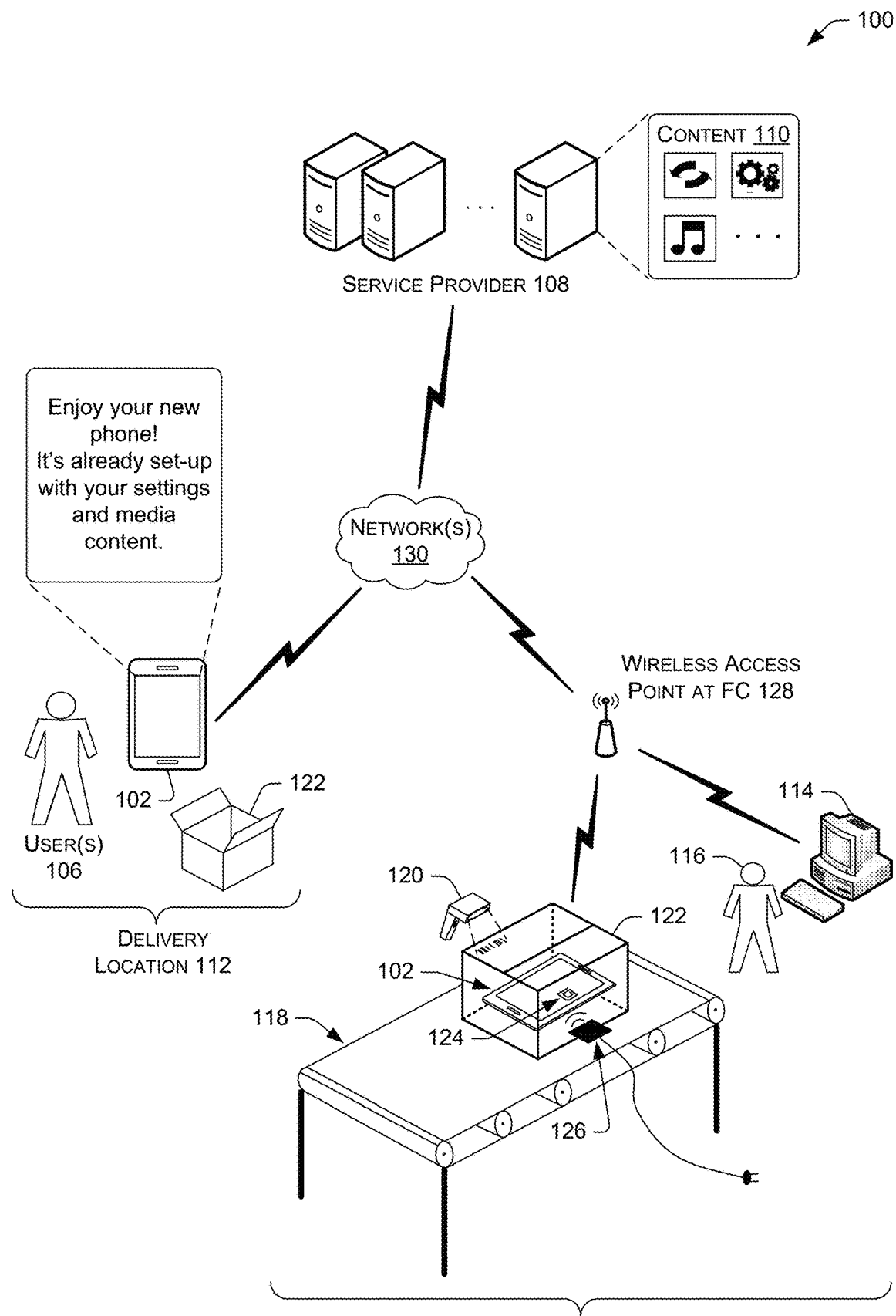
FIG. 1 illustrates an example architecture in which techniques described herein may be implemented.

This disclosure describes, in part, techniques for facilitating the configuration of a device through inductance power transfer. In some instances, a device that is packaged for shipment may be temporarily powered at a fulfillment center through inductance power transfer. While the device is temporarily powered, data associated with a user that will receive the package may be stored on the device. The data may enable the device to be automatically configured for the user. This may enhance the out-of-box experience for the user upon delivery of the device.

In some instances, a device in a packaged form may be associated with an induction coil and integrated circuit. The induction coil and integrated circuit may be integrated into the device, disposed within a package for the device (e.g., included as a label on the device, included within the package, etc.) or otherwise arranged to enable an external power source to power the integrated circuit via induction while the device is packaged for shipment. The external power source may induce a current in the induction coil to provide power to the dedicated circuitry (e.g., an integrated circuit that includes a limited amount of memory and/or may operate with a limited amount of power), a main processing unit of the device or any other component of the device.

While temporarily powered and packaged for shipment, the integrated circuit may receive data to facilitate the automatic configuration of the device for the user. In one example, a unique identifier may be downloaded to dedicated circuitry that includes a limited amount of memory and/or may operate with a limited amount of power, such as a Radio-frequency identification (RFID) tag, integrated circuit and so on. When the device is powered-on after delivery to a normal usage state, the unique identifier may be wirelessly retrieved from the dedicated circuitry and sent to a service provider to identify the user. The service provider may identify content that is associated with the user and send the content to the device. The content may include music, photos, icons for music or photos, user preferences, settings or any other content that is related to the user through an account or otherwise. In another example, content that is associated with the user may be downloaded to the device while the device is located at the fulfillment center. The content may be wirelessly downloaded to main memory or other memory of the device, so that the device is configured for usage upon delivery.

In some instances, the features and techniques described herein may allow a device to be automatically configured with content from a temporary power-on at a fulfillment center. For example, by including an induction coil in packaging for a device or within the device itself, the device may be inductively powered while the device is packaged for shipment. This may enable a device to be personalized for the user to enhance the out-of-box experience for the user. Further, this may ease the process of configuring a device at a fulfillment center. In some instances, the features and techniques may be useful for devices that do not include a battery. In other instances, any type of device may benefit from these techniques and features.

This brief introduction is provided for the reader's convenience and is not intended to limit the scope of the claims, nor the proceeding sections. Furthermore, the techniques described in detail below may be implemented in a number of ways and in a number of contexts. Some example implementations and contexts are provided with reference to the following figures, as described below in more detail. It is to be appreciated, however, that the following implementations and contexts are but some of many.

Example Architecture

FIG. 1 illustrates an example architecture 100 in which the techniques described herein may be implemented. The architecture 100 includes a device 102 to be at least partly powered at a fulfillment center 104 to facilitate an automatic configuration of the device 102 for one or more users 106

(hereinafter "the user 106"). The architecture 100 may include a service provider 108 to assist in configuring the device 102. For example, the service provider 108 may send content 110 to the fulfillment center 104 and/or a delivery location 112, so that the device 102 is automatically configured with the content 110 that is associated with the user 106 and/or the device 102. As illustrated, the architecture 100 shows the device 102 at the fulfillment center 104, where it is being prepared for shipment, and shows the device 102 at the delivery location 112, where it has been delivered to the user 106 and unpackaged.

The fulfillment center 104 may perform services for order fulfillment. The fulfillment center 104 may generally provide services to store items, receive orders for the items, package the items and ship the items to individuals. In some instances, the fulfillment center 104 is affiliated with an owner of the items (e.g., the fulfillment center 104 may be the actual owner of the items, associated with a merchant that offers the items for acquisition and so on). In one example, the fulfillment center 104 is associated with an online retailer that offers items for acquisition through an online source. In other instances, the fulfillment center 104 may fulfill item orders for non-affiliated parties. The fulfillment center 104 may include a storage facility, such as a warehouse, building, etc. Further, the fulfillment center 104 may be associated with an electronic commerce (e-commerce) entity. An acquisition of an item (such as a device) may be achieved through purchasing, renting, borrowing, trading, bartering or otherwise acquiring the item.

The fulfillment center 104 may include various items to fulfill orders. For example, the fulfillment center 104 may include one or more computing devices 114 (hereinafter "the computing device 114") to manage the fulfillment of orders. The computing device 114 may be employed by one or more users 116 and may be configured to manage the operation of equipment within the fulfillment center 104, manage the shipment of items (e.g., provide shipping addresses, identify users, identify packages based on scanned information and so on), interface with the one or more users 116 and so on. The computing device 114 may be communicatively coupled to a conveyor system 118 and a scanner 120 that are located within the fulfillment center 104. The computing device 114 may communicate with the conveyor system 118 to cause the conveyor system 118 to move. Further, the computing device 114 may communicate with the scanner 120 to receive information and/or send instructions to scan markers (e.g., barcodes).

The conveyor system 118 may move shipping packages or other items from one location to another. Although illustrated as a conveyor belt in FIG. 1, the conveyor system 118 may include any type of equipment or system, such as an overhead conveyor, roller conveyor and so on. The fulfillment center 104 may additionally, or alternatively, include other equipment, users, robots, etc. to move items from one location to another. In the example of FIG. 1, the fulfillment center 104 operates to fulfill an order from the user 106 for the device 102 (in this example the user 106 has purchased the device 102). Here, the device 102 is moved from a storage location (e.g., shelving unit) where multiple devices are stored and placed on the conveyor system 118. At this point, the device 102 may not be configured for any specific user.

As illustrated, the device 102 may be contained in a package 122. In one example, the package 122 comprises a shipping package that the device 102 is placed into (by a user, equipment or otherwise) when being prepared for shipment. In another example, the package 122 includes a storage package that the device 102 is stored in at a storage location, and possibly shipped in. For ease of illustration, in FIG. 1 the device 102 is shown as being included in a single package, although the device 102 may be contained in multiple packages (e.g., a storage package within a shipping package). The device 102 may be arranged in the package 122 with packaging material, such as foam (e.g., Styrofoam, foam peanuts etc.), plastic (e.g., plastic protectors, plastic bags etc.), cardboard and so on. The packaging material may cushion, protect and/or secure the device 102 within the package 122. The packaging material may also orient the device 102 so that an induction coil 124 of the device 102 is positioned close to an outer edge of the package 122, as discussed in further detail below.

The scanner 120 may scan the device 102 and/or the package 122, such as when the device 102 is placed on the conveyor system 118. The scanner 120 may comprise a barcode reader, camera and so on that is configured to scan a marker, such as a barcode, Quick Response (QR) code or other label. The scan data of the device 102 and/or the package 122 may be sent to the computing device 114, so that the device 102 and/or the package 122 may be linked to a user to which the package 122 is to be sent (e.g., the user 106). The computing device 114 may inform the service provider 108 that the device 102 and/or the package 122 are linked to the user 106.

As illustrated in FIG. 1, the package 122 may be positioned by the conveyor system 118 in proximity to an induction power source 126 (also referred to as "a power pad" or "Radio-frequency identification (RFID) communicator"), such as within a predetermined distance to the induction power source 126. The induction power source 126 may include an induction coil to induce an electrical current in another induction coil that is positioned in close proximity, such as the induction coil 124 of the device 102. Here, energy may generally be transferred from the induction power source 126 to the device 102 via electromagnetic induction (also referred to as induction power transfer or wireless power transfer). In many instances, the coil of the induction power source 126 and the induction coil 124 of the device 102 may not come into contact, but may be positioned within a distance of each other (e.g., a predetermined distance) so that the device 102 may be powered while packaged. In some instances, the induction power source 126 comprises an RFID communicator configured to communicate with a component of the device 102. For example, the induction power source 126 may comprise a radio transmitter referred to as an interrogator or reader that sends signals to an RFID tag (e.g., to store or request information) and receives responses from the RFID tag. Further, in some instances the induction power source 126 is configured to communicate with the device 102 via a short-range standard, such as Near Field Communication (NFC), Bluetooth® and so on. The induction power source 126 may also communicate with the computing device 114. Although illustrated as being included on the device 102, in many instances the induction coil 124 may be provided elsewhere, as discussed in further detail below.

Although the induction power source 126 is illustrated as being included in the conveyor system 118, the induction power source 126 may be included anywhere in the fulfillment center 104. For example, the induction power source 126 may be embedded within or placed on a table where a shipping package or device is placed to be temporarily powered. In another example, the induction power source 126 is included within other equipment or items of the fulfillment center 104, such as the scanner 120, the computing device 114, a shelf and so on.

While the device 102 is positioned in proximity to the induction power source 126, the device 102 may be temporarily powered by the induction power source 126 to receive data. In one example, a processing element, memory, radio and/or another component of the device 102 may be powered so that content that is associated with the user 106 may be stored to the device 102. Here, upon receiving power, the device 102 may search for and connect to a wireless access point 128 that is located within communication range (e.g., within the fulfillment center 104). The wireless access point 128 may generally comprise a Wi-Fi® access point, a cellular access point (e.g., cellular tower), a Bluetooth® access point and so on. In some instances, the device 102 may connect to an access point that has been previously connected to or for which access credentials are known (e.g., password). The device 102 may operate in cooperation with the computing device 114 and/or the service provider 108 to identify content 110 that is associated with the user 106.

To illustrate, the computing device 114 may receive scan data from the scanner 120 for the package 122. The scan data may be utilized to determine that the device 102 is included within the package 122 (e.g., based on the device 102 having been previously scanned and associated with the package 122). The computing device 114 may also determine that the package 122 is to be shipped to the user 106 based on shipping information for the package 122. The computing device 114 may then send information that identifies the user 106 to the service provider 108, such as a name of the user 106, email address, telephone number, mailing address and so on. The service provider 108 may identify the user 106 and content 110 that is associated with the user 106 or the device 102, such as content that is linked to an account of the user 106 (e.g., music, photographs etc.), content for updating software of the device and so on. The content 110 may be provided to the fulfillment center 104 and downloaded to the device 102. For instance, the content 110 may be sent from the wireless access point 128 directly to the device 102. By doing so, the device 102 may be pre-configured before shipment.

In another example, the device 102 may include dedicated circuitry that may be temporarily powered to store a unique identifier that is associated with the user 106. The dedicated circuitry may be powered-on while other components of the device 102 remain in a non-powered state (e.g., no power is provided to the other components). The dedicated circuitry may include an integrated circuit with processing and/or storage capabilities. The dedicated circuitry may be disposed on the device 102 (e.g., in a label), disposed within the device 102, disposed in the package 122 or otherwise located in proximity to the device 102. In one instance, the dedicated circuitry is implemented in an RFID tag that operates with a limited amount of memory and/or a limited amount of power. In any event, the unique identifier for the user 106 may be stored in the memory of the dedicated circuitry. The unique identifier may comprise a value that uniquely identifies the user 106. The device 102 may receive the unique identifier from the induction power source 126, such as via a modulated signal, while the device 102 is temporarily powered. The unique identifier may also be provided to the service provider 108 to be associated with the user 106 and/or the device 102. The device 102 may then be shipped to the user 106 with the unique identifier stored therein.

At the delivery location 112, when the user 106 powers-on the device 102 (e.g., for the first time), other components of the device 102 may obtain the unique identifier from the memory of the dedicated circuitry. The other components may be configured to power-on when the user 106 initiates a normal powering-on operation (e.g., through a power button). For example, the other components may include main processing unit (e.g., central processing unit), main memory and so on. Once the unique identifier has been obtained from the dedicated circuitry, the device 102 may send the unique identifier to the service provider 108. In some instances, the service provider 108 may utilize the unique identifier and a device identifier (ID) that is also provided by the device 102 to link the device 102 to a user account that associated with the unique identifier. Additionally, or alternatively, the service provider 108 may identify content that is associated with the user 106 (e.g., based on the user account and/or the unique identifier) and send the content to the device 102. By utilizing the unique identifier without receiving user input to configure the device 102, the device 102 may be automatically configured for the user 106. As illustrated in FIG. 1, the device 102 is in an unpackaged form at the delivery location 112.

The device 102 (at the fulfillment center 104 and/or the delivery location 112), the computing device 114 and/or the scanner 120 may communicate via one or more networks 130 (hereinafter "the network 130"). The network 130 represents any one or combination of multiple different types of networks, such as the Internet, cable networks, wireless networks, wired networks, and so on.

The conveyor system 118, the induction power source 126, the scanner 120, the computing device 114 and/or the wireless access point 128 may generally represent a fulfillment center system.

Although many techniques are described herein as being performed by a specific device, the techniques may be performed by any device. For example, techniques that are described as being performed by the service provider 108 may be performed locally at the fulfillment center 104 (e.g., by the computing device 114).

Example Service Provider

Figure 2:
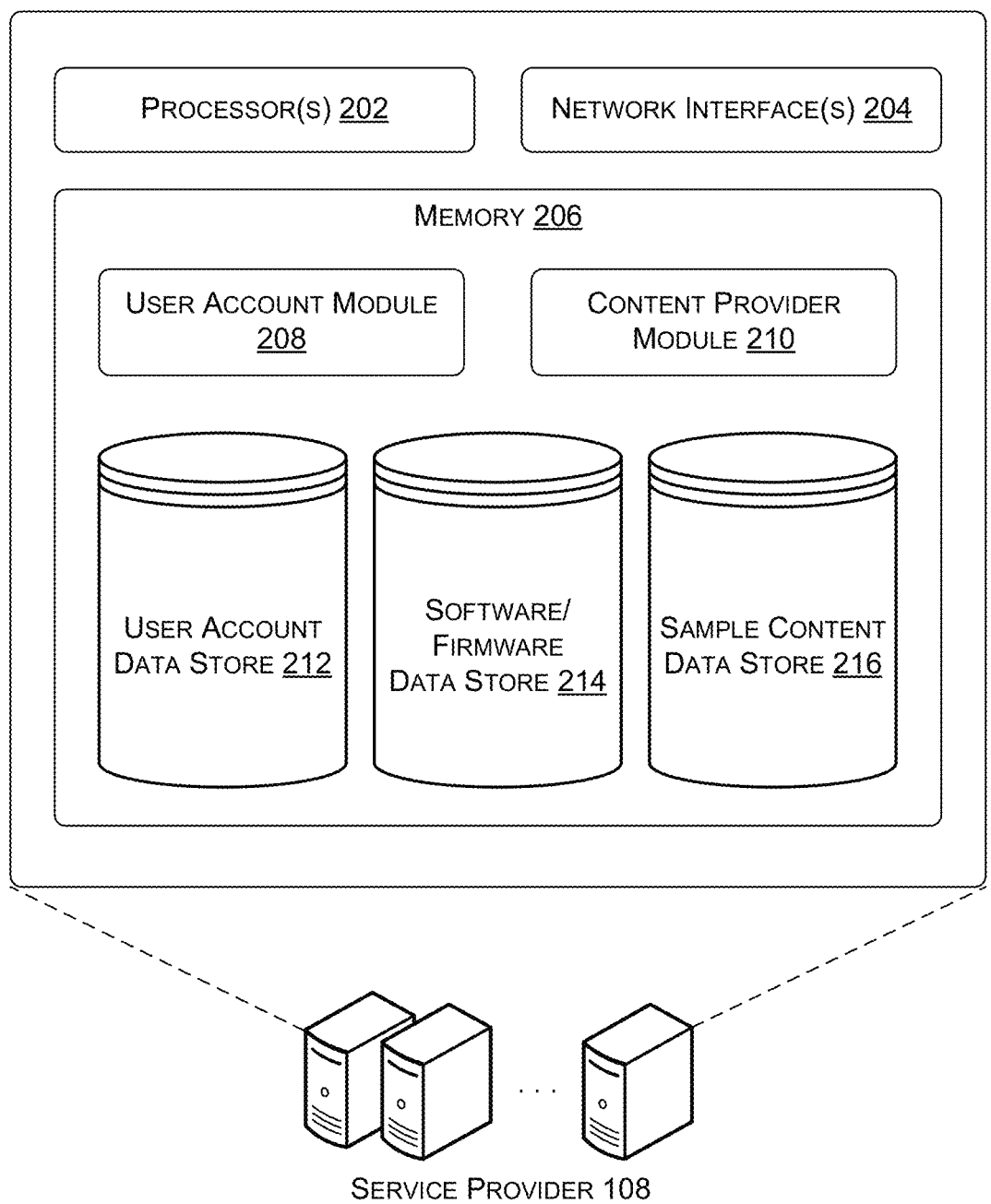
FIG. 2 illustrates example details of a service provider.

FIG. 2 illustrates example details of the service provider 108 of FIG. 1. The service provider 108 may be implemented as one or more computing devices including servers, desktop computers, laptops or the like. In one example, the service provider 108 is configured in a server cluster, server farm, data center, mainframe, cloud computing environment, or a combination thereof. To illustrate, the service provider 108 may operate as a cloud computing device that provides cloud services, such as storage, processing and so on.

The one or more computing devices of the service provider 108 may be equipped with one or more processors 202, one or more network interfaces 204 and memory 206. These components may be communicatively coupled to each other. The one or more processors 202 may include a central processing unit (CPU), a graphics processing unit (GPU), a microprocessor, a digital signal processor (DSP) and so on. The memory 206 may include software and/or firmware functionality configured as one or more "modules." The term "module" is intended to represent example divisions of the software and/or firmware for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated in FIG. 2, the memory 206 may include a user account module 208 and a content provider module 210. The modules 208 and 210 may be executable by the one or more processors 202 to perform various operations.

The user account module 208 may manage accounts of users. For example, the user account module 208 may store and/or provide access to any information that is associated with a user through a user account. The information that is associated with a user may be stored in a user account data store 212. Example information that may be associated with a user through a user account includes:

- A device identifier (ID) that identifies a device associated with a user, such as a MAC address or other uniquely identifying information. In some instances, a device ID may link a user to a device that the user is already in possession of. In other instances, the device ID may link a user to a device that is yet to be delivered to the user (e.g., has just been acquired and is in process of being shipped). For example, the fulfillment center 104 may provide a device ID to the service provider 108 that identifies a device that is going to be shipped to the user. In some examples, a user account may link a user to multiple devices (e.g., the user account may store multiple device IDs).
- A package ID that identifies a package for a user. The fulfillment center 104 may send a package ID to the service provider 108 along with information that identifies a user, so that a package may be linked to the user. The package may include a device that is to be shipped to the user.
- Unique identifier that identifies a user (e.g., a value that uniquely identifies the user). The unique identifier may be made available to the fulfillment center 104, so that the unique identifier may be stored on a device that will be shipped. As noted above, a unique identifier that is stored in a device may be provided to the service provider 108 to automatically configure the device with content when the device is powered-on after delivery. In some instances, the unique identifier is generated at the service provider 108, while in other instances the unique identifier is generated at the fulfillment center 104.
- Other information for a user, such as a name of the user, telephone number, mailing address and so on.
- A setting for a device that is associated with a user. For example, the setting may include a wireless access point setting, such as a network name and/or password for a network that a user may desire to connect to with a device. In another example, the setting may include a password for a device (e.g., to lock the device) and/or an account name for a device (e.g., user account to use for backing-up data, downloading content, etc.).
- A user preference that is associated with a user, such as a bookmarked webpage, a home location of a user, a sound for a text message and so on.
- A media content item that is associated with a user, such as music, photographs, videos, images, electronic books (e-books) and so on.
- An icon or graphic that is associated with a media content item (e.g., an icon that represents an e-book, an icon that is linked to an e-book that is stored at the service provider 108 and so on).
- Contact information for individuals in a user's contact list (e.g., telephone numbers, email addresses, mailing address and so on for friends of the user).
- An application that is associated with a user. For example, when a user downloads a mobile application to a device through a user account, the application may be associated with the user through the user account.
- Any other information.

Meanwhile, the content provider module 210 may provide content to devices to configure the devices for users. For instance, the content provider module 210 may receive a request for content that is associated with a user or a device (e.g., a request for configuration information), while the device is at a delivery location 112 and/or the fulfillment center 104. The request may include information that identifies the user or the device, such as a unique identifier for the user, a device ID, a name of the user, email address, telephone number, mailing address and so on. The content provider module 210 may identify any content that is associated with the user or the device. In one example, the content provider module 210 may identify a wireless access point setting and music that are associated with an account of the user. In another example, the content provider module 210 may identify a software/firmware update that is queued to be sent to the device. The software/firmware update may be stored in a software/firmware data store 214. In yet a further example, the content provide module 210 may identify sample content and/or an advertisement to be provided to the device (e.g., a promotional movie that is being provided for free to new devices, an advertisement for content, etc.). In any event, the content provider module 210 may send the content that is associated with the user and/or the device to the requesting entity (e.g., the fulfillment center 104, a device onto which the content will be downloaded and so on).

The content provider module 210 may provide any type of content to an entity for download to a device. Example content includes:

- Any information that may be associated with a user through a user account, as noted above.
- An advertisement (e.g., an ad indicating that a discount for a particular product is being offered, an ad to purchase a new car and so on).
- Sample content—a portion of a media content item (e.g., a portion of an e-book that is being offered for free as a trial, one track from an album and so on).
- Any other content.

In some instances, the content provider module 210 may select personalized content to provide to a device. For example, based on user preferences for a user, the content provider module 210 may select an advertisement for an item that is predicted to be of interest to the user. In another example, the content provider module 210 may select sample content, such as a portion of an e-book, to be provided to a user based on the user consuming another e-book that is deemed similar to the sample e-book.

While many operations of the service provider 108 are described as being performed by modules, any of these operations, and/or other techniques described herein, may be implemented as one or more hardware logic components, such as Field-Programmable Gate Arrays (FPGAs), Application-Specific Integrated Circuits (ASICs), System-on-a-chip systems (SOCs), Complex Programmable Logic Devices (CPLDs), etc.

Example Package

Figure 3:
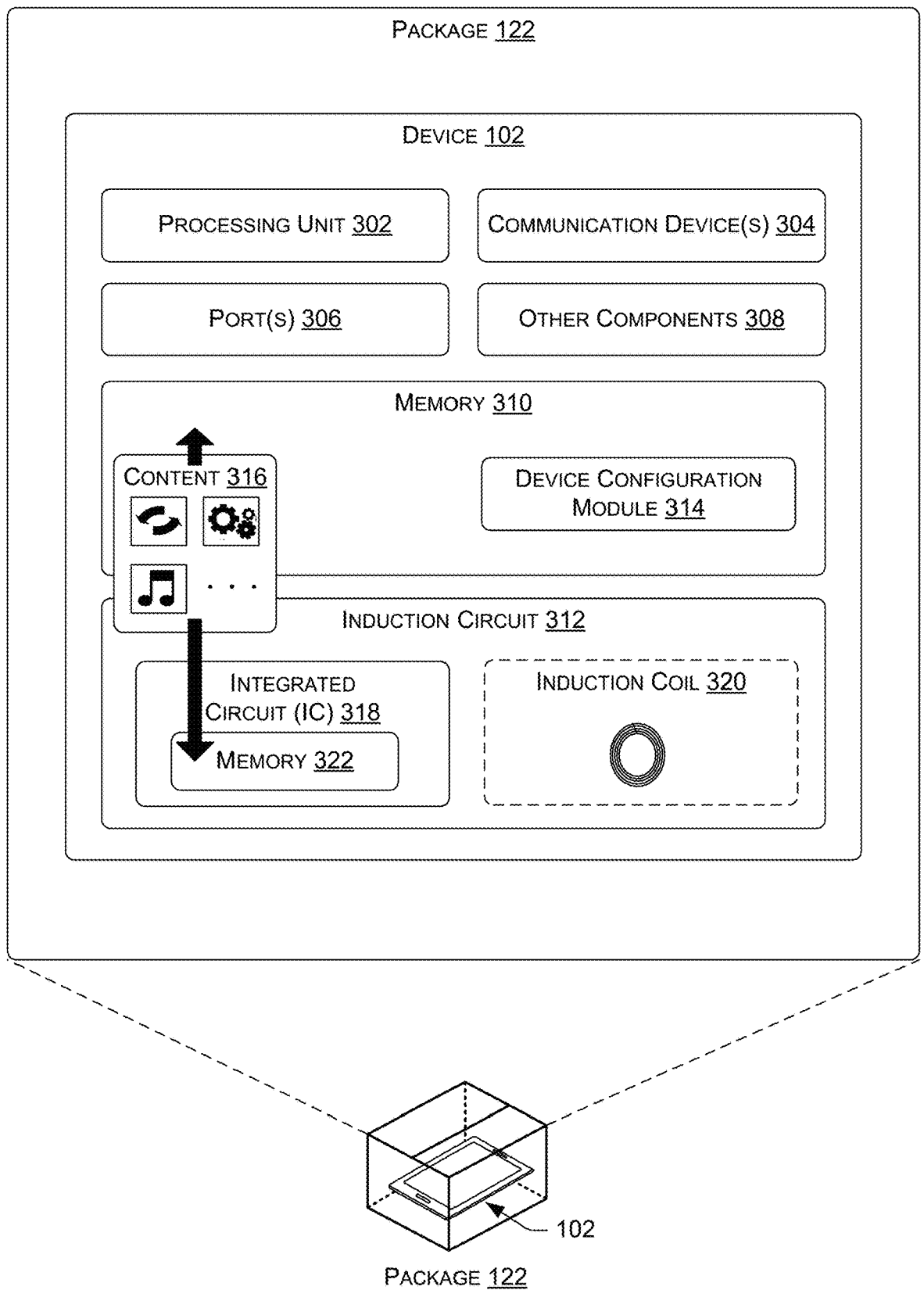
FIG. 3 illustrates example details of a package.

FIG. 3 illustrates example details of the package 122 of FIG. 1. As noted above, the package 122 may represent a shipping package, a storage package or any other type of package. The package 122 may be comprised of cardboard, fiberboard, plastic, metal, etc.

The package 122 may contain the device 102, which may represent any type of electronic device that is configured to store content. The device 102 may include a computing device, such as a laptop computer, a desktop computer, a smart phone, an electronic reader device (e.g., an e-Book reader device), a mobile handset, a personal digital assistant (PDA), a portable navigation device, a portable gaming device, a game console, a camera, a tablet computer, a wearable computer (e.g., smart watch, smart glasses, etc.), a portable media player, a set top box and so on.

The device 102 may include an enclosure to house components. The enclosure may include a casing, covering, frame, housing, container or other structure to enclose and/or protect the components of the device 102. The components of the device 102 may include a processing unit 302 (e.g., main processing unit), one or more communication devices 304 (e.g., radios), one or more ports 306, other components 308, memory 310 and an induction circuit 312. The components may be connected to the enclosure of the device 102 and may be communicatively coupled to each other. The processing unit 302 may comprise one or more processors implemented as a central processing unit (CPU), a graphics processing unit (GPU), a microprocessor, a digital signal processor (DSP) and so on. The processing unit 302 may be configured to operate when the device 102 is powered via a main power source, such as via a battery source included in the device 102, a power outlet connected to the device 102 and so on. In many examples, when the processing unit 302 is powered-on, the device 102 may be referred to as being in a processing state (or normal usage state) in which the device 102 is enabled to perform operations (e.g., display content, send information to and receive information from another device, receive user input and so on). In the processing state, one or more additional components (e.g., a display, an input/output device, memory, a sensor, etc.) may be powered-on or enabled to allow the device 102 to perform operations. Further, in some instances the processing unit 302 may be configured to be powered via the induction circuit 312. For example, the processing unit 302 may be powered via inductance power transfer that is facilitated by an induction power source that is positioned in proximity to the device 102. In many instances, the processing unit 302 and/or induction circuit 312 (the integrated circuit 318) may be referred to as a processing element.

The one or more communication devices 304 may comprise a cellular network radio (e.g., 3G or 4G wireless radio), a Wi-Fi® radio, a Bluetooth® radio, Near Field Communication (NFC) radio and so on. The one or more communication devices 304 may be configured to communicate with a wireless access point, another device and so on. In one example, the one or more communication devices 304 may receive content that is associated with a user from a wireless access point of a fulfillment center. The one or more ports 306 may include a Universal Serial Bus (USB®) or micro USB port, a proprietary port or any other connection port for facilitating an electrical connection. The one or more ports 306 may be at least partly disposed on an edge of the enclosure of the device 102 to be accessible to external devices. The one or more ports 306 may be configured to receive power and/or data. In one example, the one or more ports 306 are connected to a power management unit that manages power to the components of the device 102. The power management unit may provide power to any component of the device 102. Alternatively, or additionally, the one or more ports 306 may be connected to the induction circuit 312 so that power and/or data may be provided to the induction circuit 312. The one or more other components 308 may include one or more input/output devices (e.g., mouse, keyboard, etc.), one or more cameras (e.g., rear-facing, front facing, etc.), one or more displays (e.g., touch screen), one or more sensors (e.g., accelerometer, magnetometer, proximity sensors, Global Positioning System (GPS), etc.), one or more speakers, one or more microphones, one or more batteries, one or more power management units to manage power to the components of the device 102 and so on.

The memory 310 may include a device configuration module 314 that facilitates the configuration of the device 102 with particular content. The device configuration module 314 may be executable by the processing unit 302. As such, the device configuration module 314 may generally perform operations when power is provided to the processing unit 302. The device configuration module 314 may cause content 316 to be stored in the memory 310. In one example, the content 316 may be stored to the memory 310 when the processing unit 302 is temporarily powered via the induction circuit 312, such as at a fulfillment center. The content 316 may be provided from the service provider 108. In another example, the content 316 may be stored to the memory 310 when the device 102 is powered by a main power source, such as when the device 102 is powered at a delivery location for a first time. Here, the device 102 may utilize a unique identifier that is associated with a user (and that is stored in memory 322 of the induction circuit 312) to obtain the content 316 from the service provider 108.

The induction circuit 312 may facilitate electromagnetic induction to power the device 102. The induction circuit 312 may include an integrated circuit 318 and an induction coil 320. The integrated circuit 318 may be dedicated circuitry that is configured to be powered with a relatively small amount of power (e.g., less than a threshold amount) and/or is configured with a limited amount of memory (e.g., memory 322 may include less than a particular amount of storage space). The integrated circuit 318 may comprise a microcontroller, microprocessor, ASIC, digital signal processor and so on. At least a portion of the memory 322 may comprise non-volatile memory. The integrated circuit 318 may be configured to communicate with components of the device 102 (e.g., the processing unit 302, communication device 304, etc.) through a wired and/or wireless connection. The induction coil 320 may generally comprise a wire that is arranged in any number of loops to facilitate inductance power transfer. In other words, the induction coil 320 may be induced with an electrical current from an induction power source that is external to the device 102. The induction coil 320 is illustrated with a dotted line to indicate that the induction coil 320 may be integrated into the device 102 or associated with the device 102. In one example, the induction coil 320 is external to the device 102 and is connected to the one or more ports 306. The one or more ports 306 may be connected to the induction circuit 312 to provide power to the induction circuit 312. In another example, the induction coil 320 is integral with the device 102.

In some instances, the induction circuit 312 may be implemented as a label, card or other device. The label may comprise an adhesive label, such as a sticker. The induction circuit 312 may be disposed on or within the device 102. In one example, the induction circuit 312 is implemented as a label that is disposed on an exterior or interior surface of the enclosure of the device 102. Further, in some instance the induction circuit 312 may comprise an RFID tag with the induction coil 320 operating as an antenna to receive data and a coil to be induced with a current.

In many instances discussed herein, content and/or a unique identifier are received at the device 102 via a wireless connection, such as via the one or more communication devices 304. Alternatively, or additionally, the content and/or unique identifier may be received via the induction coil 320 as a modulated signal. For instance, in the case where the induction circuit 312 is implemented as an RFID tag, the integrated circuit 318 may receive a modulated signal via the induction coil 320. The modulated signal may include a unique identifier that is associated with a user. The unique identifier may be stored in the memory 322 and later accessed by other components of the device 102.

Further, although the content 316 is discussed as being stored in the memory 310, in some instances the content 316 may be stored in the memory 322 of the integrated circuit 312. To illustrate, a wireless access point setting may be stored in the memory 322 when the device 102 is temporarily powered at a fulfillment center. Thereafter, when the device 102 is powered at a customer location, the wireless access point setting may be retrieved from the memory 322 and utilized to access the associated wireless access point.

The memory 310 and/or 322 (as well as all other memory described herein, including the memory 206 of the service provider 108) may include one or a combination of computer-readable media (e.g., storage media). Computer-readable media includes volatile and non-volatile, removable and non-removable media implemented in any method or technology for storage of information, such as computer readable instructions, data structures, program modules, or other data. Computer-readable media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves. As such, computer-readable media comprises non-transitory computer-readable media.

Example Induction Coil Configurations

Figure 4A:
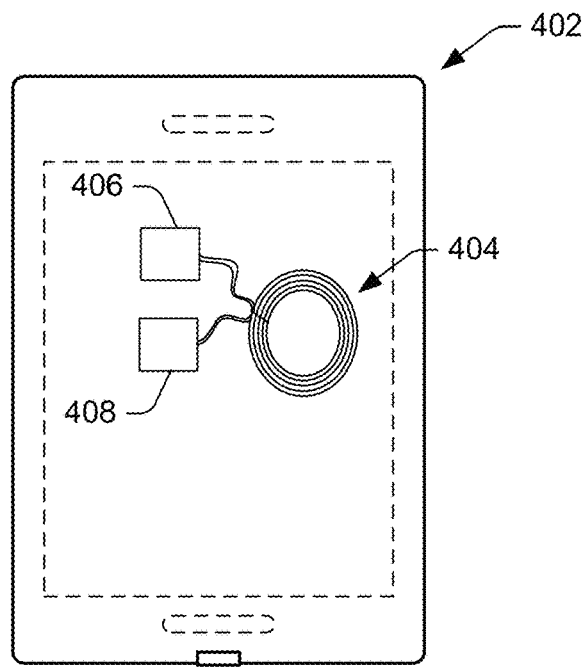
FIG. 4A illustrates an example device with an induction coil disposed on or within the device.

FIG. 4A illustrates an example device 402 with an induction coil 404 disposed on or within the device 402. In this example, the induction coil 404 may be connected to an integrated circuit 406 (dedicated circuitry) and/or a power management unit 408. The integrated circuit 406 may be configured to communicate with any component of the device 402 through a wired and/or wireless connection. When the induction coil 404 is connected to the power management unit 408, any component of the device 402 may be powered when a current is induced in the induction coil 404. When the induction coil 404 is connected to the integrated circuit 406, the integrated circuit 406 may be powered via induction. In some instance, the induction coil 404 and the integrated circuit 406 are implemented in a label (e.g., sticker) or card that is disposed on an exterior surface of the device 402. Further, the induction coil 404 and integrated circuit 406 may be integral with each other (e.g., included on a same chip). In other instances, the label or card may be disposed within the device 402, such as connected to an interior surface. In yet further instances, the induction coil 404 may be disposed on an external or internal surface of the device 402 and connected to the power management unit 408 that is located within the device 402.

Figure 4B:
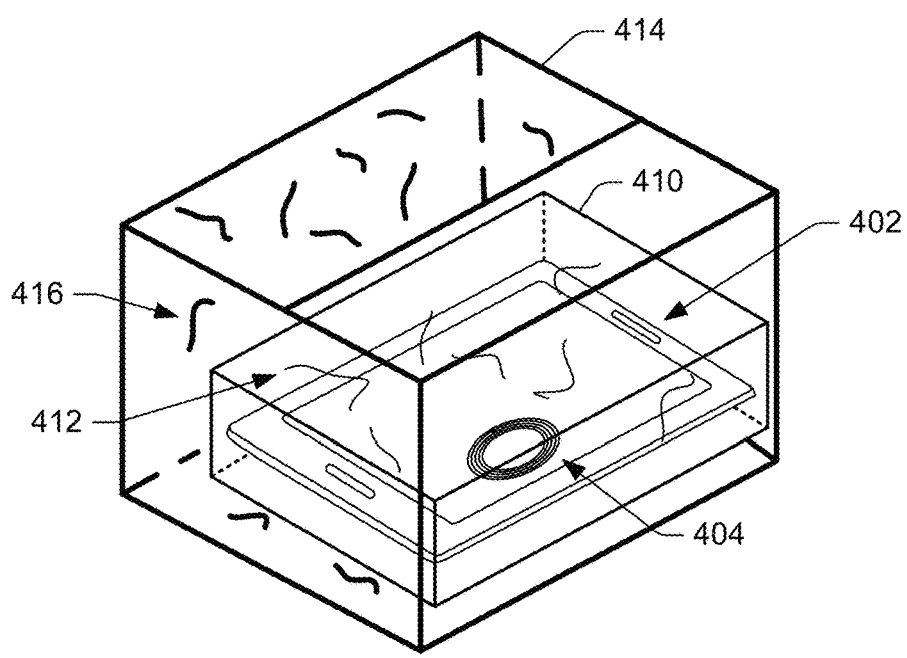
FIG. 4B illustrates the example device of FIG. 4A arranged for shipment to a user.

FIG. 4B illustrates the example device 402 arranged for shipment to a user. In particular, the device 402 is located within a storage package 410. The storage package 410 may contain the device 402 for storage at a fulfillment center or other facility. The device 402 may be arranged in the storage package 410 with packaging material 412, such as foam (e.g., Styrofoam, foam peanuts etc.), plastic (e.g., plastic protectors, plastic bags etc.), cardboard and so on. For ease of illustration, the packaging material 412 is shown with line segments, however, the packaging material may take any form. As noted above, packaging material may cushion, protect and/or secure an enclosed device.

As illustrated in FIG. 4B, the storage package 410 may be arranged within a shipping package 414. The shipping package 414 may include packaging material 416 to secure the storage package 410 within the shipping package 414. The packaging material 416 may be similar to the packaging material 412 that secures the device 402 within the storage package 410. Although the device 402 is illustrated as being included in both the storage package 410 and the shipping package 414 for shipment, in some instances the device 402 may be shipped without being placed in the shipping package 414.

As noted above, the device 402 may be secured for shipment within the storage package 410 and the shipping package 414. The device 402 may be arranged in the storage package 410 and/or the shipping package 414 so that the induction coil 404 is positioned in proximity to an edge or surface of the shipping package 414 (e.g., within a predetermined distance of the edge or surface). Here, the induction coil 404 is positioned toward a bottom of the shipping package 414 so that an induction power source that is external to and below the shipping package 414 may induce a current in the induction coil 404. In some instances, the shipping package 414 may include a marking to indicate where the induction coil 404 is located within the shipping package 414. This may assist a user, conveyor equipment, scanner and so on in positioning the induction coil 404 of the shipping package 414 in proximity to an induction power source. For ease of illustration, the integrated circuit 406 and/or the power management unit 408 are not shown in FIG. 4B.

Figure 5A:
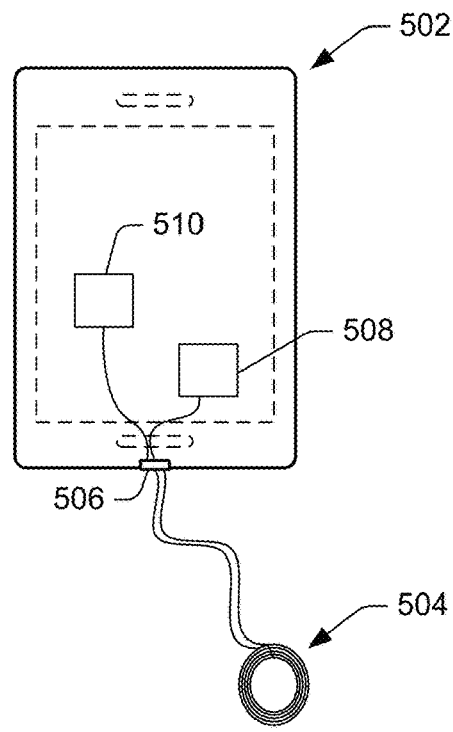
FIG. 5A illustrates an example device with an induction coil connected to the device.

FIG. 5A illustrates an example device 502 with an induction coil 504 connected to the device 502. In this example, the induction coil 504 is external to the device 502, so that it may be positioned within a package for the device 502, such as that shown in FIG. 5B. The induction coil 504 may be connected to a port 506 of the device 502, such as a micro USB port or other port that may already be incorporated into a device. The port 506 may be connected to an integrated circuit 508 (dedicated circuitry) and/or a power management unit 510. When connected to the power management unit 510, any component of the device 502 may be powered when a current is induced in the induction coil 504. In some instances, the induction coil 504 may be encapsulated within a sticker or card.

Figure 5B:
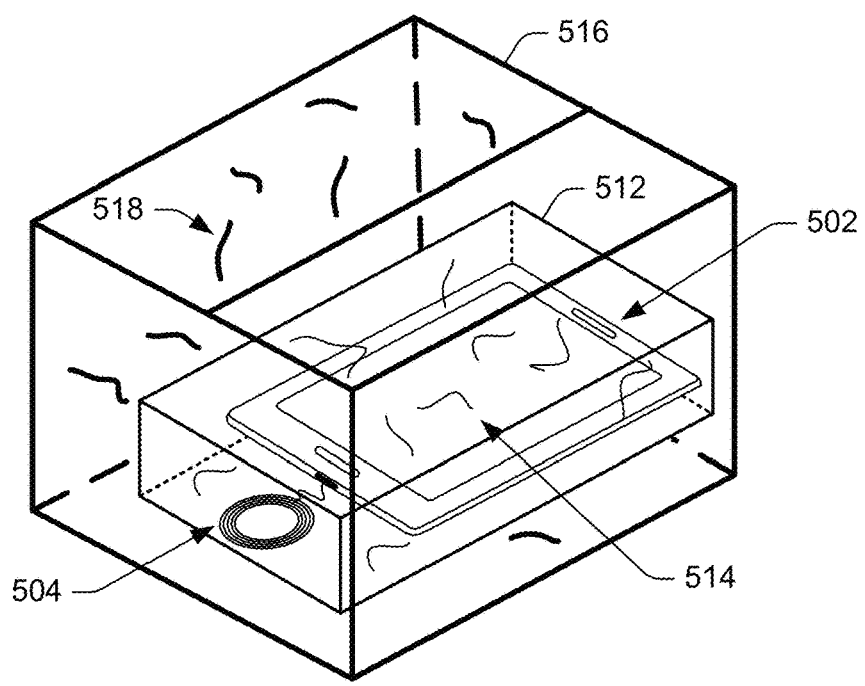
FIG. 5B illustrates the example device of FIG. 5A arranged for shipment to a user.

FIG. 5B illustrates the example device 502 arranged for shipment to a user. The device 502 may be arranged in a storage package 512, which is used to contain the device 502 at a fulfillment center or other storage facility. The device 502 may be arranged in the storage package 512 with packaging material 514. The storage package 512 may be arranged within a shipping package 516 with packaging material 518. The packaging material 514 and/or the packaging material 518 may comprise any packaging material that is discussed above in reference to FIG. 4B, and/or may comprise any other packaging material discussed herein.

Again, for ease of illustration, the packaging material 514 and/or the packaging material 518 is shown with line segments, however, the packaging material 514 and/or the packaging material 518 may take any form.

The induction coil 504 may be arranged in the storage package 512 (e.g., by the packaging material 514) so that the induction coil 504 is positioned at a particular location. The induction coil 504 may generally be positioned on an internal surface of the storage package 512 (or within a distance to the internal surface) to facilitate induction power transfer through the storage package 512 and/or the shipping package 516. As such, the packaging material 514 may assist in securing the induction coil 504 in the particular location. In some instances, the storage package 512 and/or the shipping package 516 may include a marking to indicate where the induction coil 504 is generally located. To illustrate, the shipping package 516 may include an outline of the induction coil 504 on an outer surface of the shipping package 516. This may assist a user, conveyor equipment, scanner and so on in positioning the induction coil 504 of the shipping package 516 in proximity to an induction power source.

Example Interfaces

Figure 6:
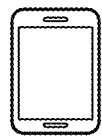
FIG. 6 illustrates an example interface to provide information to pre-configure a device for a user.

FIG. 6 illustrates an example interface 602 to provide information to pre-configure a device for a user. In this example, the interface 602 is provided as part of a checkout process for acquiring the device. Here, the user has placed the device (ABC Co. tablet) in an electronic shopping cart on an online retailer site and navigated to a checkout interface for the device. Through the interface 602 the user may provide information so that the device is automatically configured for the user upon delivery or upon powering-on the device. In other examples, the interface 602 may be provided in other contexts besides a checkout process. The interface 602 may be displayed via a browser, an application, and so forth. In some instances, an application is implemented as a client application, such as a mobile application, desktop-based application, etc.

The interface 602 includes a section 604 to enable a user to provide wireless settings, such as settings for a wireless access point. The section 604 includes a radio control 606 to enable the new tablet to be configured with current wireless settings that are configured on a device through which the interface 602 is provided (e.g., the device the user is currently using to purchase the new device). When the radio control 606 is selected, the current wireless settings may be obtained from the device that is being used to display the interface 602. The wireless settings may comprise a password, network name and so on. Alternatively, the user may provide wireless settings through a drop down menu 608 and/or input field 610. As illustrated, the drop down menu 608 may allow the user to select a wireless network and the input field 610 may allow the user to input a password for the selected wireless network.

The interface 602 also includes a section 612 to enable a user to associate the new device with a user account. The section 612 includes an input field 614 to receive an account name for the user, such as an email address or other account identifier, and an input field 616 to receive a password for the account. The interface 602 also includes a submit button 618 to submit the wireless settings and/or account information to a service provider so that the information may be used to automatically configure the new device for the user. That is, by providing the wireless settings and/or the account information, the new device may be automatically configured with the wireless settings and/or content that is associated with the user account.

Figure 7:
FIG. 7 illustrates an example interface that presents information regarding content that has been associated with a newly acquired device.
Figure 7:
Figure 7:
Figure 7:
Figure 7:

FIG. 7 illustrates an example interface 702 that presents information regarding content that has been associated with a newly acquired device. In one example, the interface 702 is presented when the device is powered-on for the first time after delivery to a user. In other examples, the interface 702 is presented in other contexts. The interface 702 may be displayed via a browser, an application and so forth. In some instances, an application is implemented as a client application, such as a mobile application, desktop-based application, etc.

As illustrated, the interface 702 shows icons 704-712 for content that is associated with the user and is now linked to the newly acquired device. The content may have been associated with the user through acquiring the content on another device with a user account or through otherwise associating the content with the user account (e.g., relating captured pictures to the user account). The content may then be associated with the newly acquired device. The icons 704-712 may be sent to the device from a service provider that stores the content, such as the service provider 108. In some instances, the icons 704-712 represent content (or a portion of the content) that is stored at a remote site to the device, such as the service provider 108. In other instances, the icons 704-712 represent content (or a portion of the content) that has already been stored locally on the device. In any event, in response to the user selecting an icon, the corresponding content may be presented to the user and/or downloaded to the device. The content may be presented in a streaming manner. As such, the icons 704-712 may enable the content to be viewed and/or downloaded to the device. In this example, the icon 704 represents an e-book titled "The Vampire Hunter," the icon 706 represents a song by "The Boy Band," the icon 708 represents a documentary for Seattle, the icon 710 represents a photo album for photographs that the user has taken on another device and the icon 712 represents a map application that was downloaded to another device.

Example Processes

Figure 8:
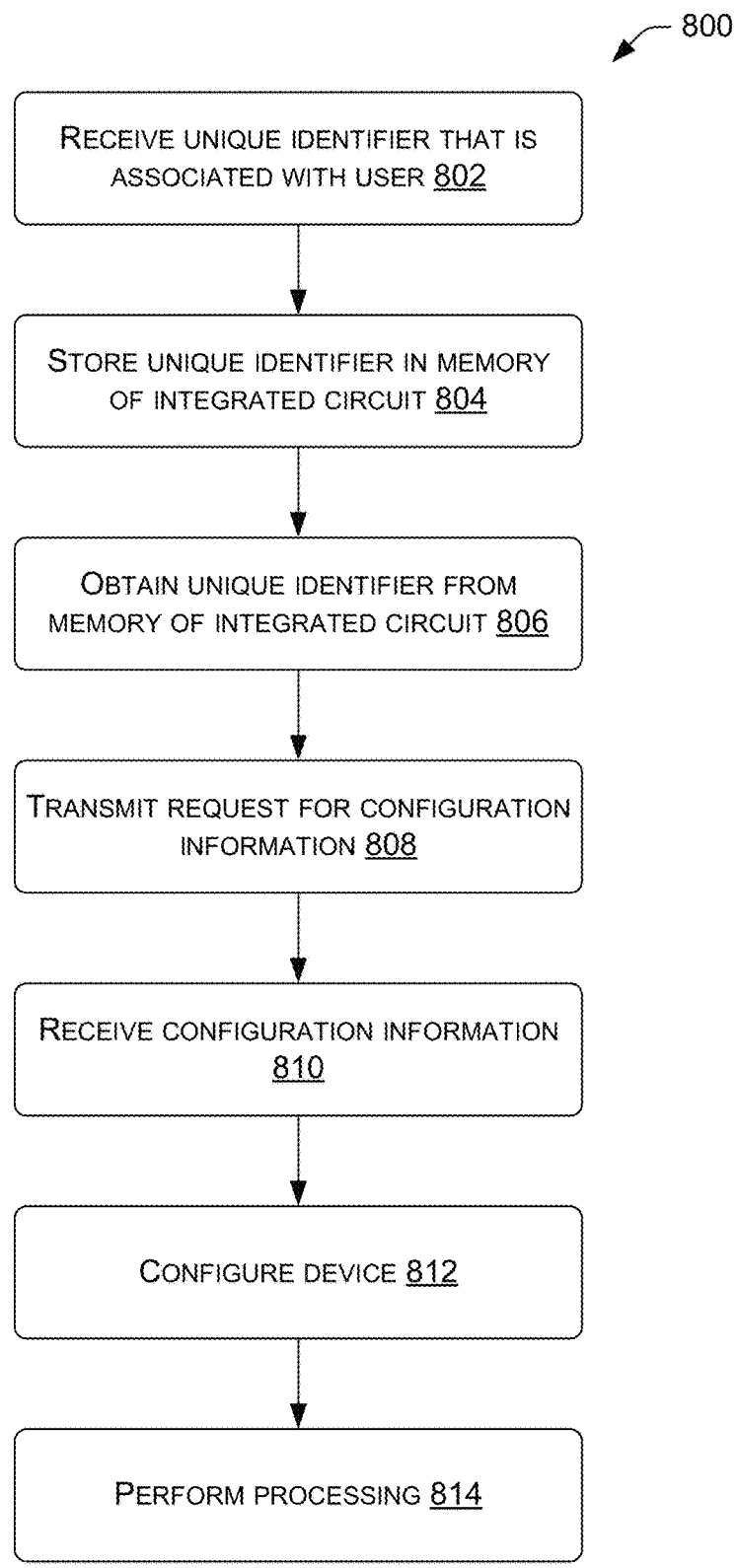
FIG. 8 illustrates an example process for powering an electronic device via induction to store a unique identifier that is used for configuring the electronic device.
Figure 9:
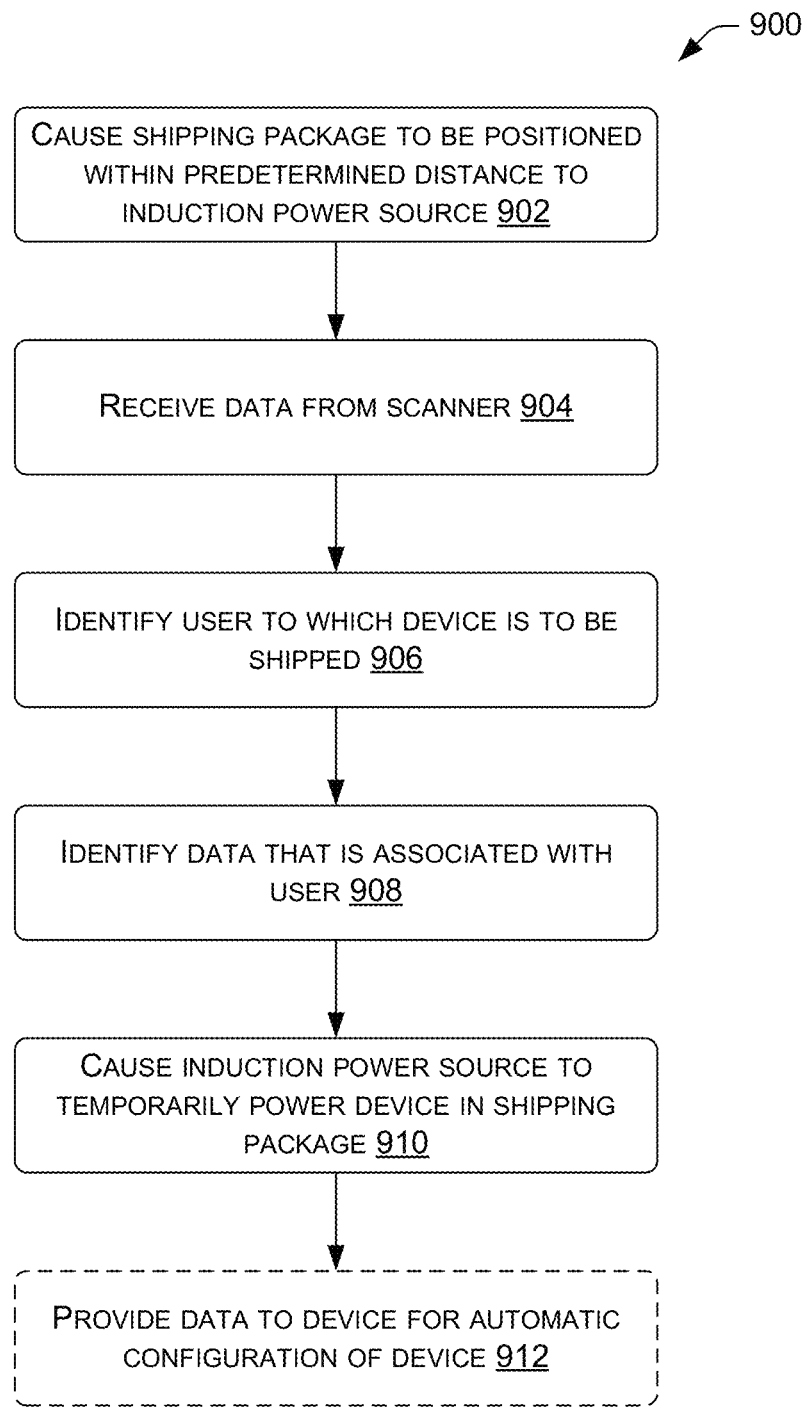
FIG. 9 illustrates an example process to cause a device to be temporarily powered while located within a shipping package to store data for the automatic configuration of the device.

FIGS. 8 and 9 illustrate example processes 800 and 900 for implementing techniques described herein. For ease of illustration the processes 800 and 900 are described as being performed in the architecture 100 of FIG. 1. For example, one or more of the individual operations of the process 800 may be performed by the device 102, while one or more of the individual operations of the process 900 may be performed by the computing device 114. However, the processes 800 and 900 may be performed in other architectures. Moreover, the architecture 100 may be used to perform other processes.

The processes 800 and 900 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any of the operations may be omitted.

FIG. 8 illustrates the example process 800 for powering an electronic device via induction to store a unique identifier that is used for configuring the electronic device.

At 802, the integrated circuit 318 may receive, via the induction coil 320, a unique identifier that is associated with a user. As noted above, the integrated circuit 318 may be connected to the induction coil 320 and may be associated with the device 102. In some instances, the integrated circuit 318 is included within the device 102, while in other instances the integrated circuit 318 is disposed on an exterior of the device 102 or is located within a predetermined proximity to the device 102. In some examples, the unique identifier may be received wirelessly from a Radio-frequency identification (RFID) communicator, in other examples the unique identifier may be received from a wireless access point, another device and so on.

At 804, the integrated circuit 318 may store the unique identifier in the memory 322 of the integrated circuit 318. The unique identifier may be stored while the integrated circuit is inductively powered via the induction coil 320.

At 806, the processing unit 302 of the device 102 may obtain the unique identifier from the memory 322 of the integrated circuit 318. The unique identifier may be obtained in response to the processing unit 302 powering-on. The unique identifier may be wirelessly received from the integrated circuit 318, such as when the integrated circuit 318 is implemented as a label on an exterior of the device 102. Alternatively, or additionally, the unique identifier may be provided from the integrated circuit 318 via a wired connection.

At 808, the device 102 may transmit a request for configuration information to the service provider 108 based on the unique identifier. In some instances, this may include transmitting the unique identifier to the service provider 108. The operation 808 may be performed by the one or more communication devices 304.

At 810, the device 102 may receive configuration information from the service provider 108. The configuration information may include a setting for a wireless access point, an icon that represents a media content item or a portion of a media content item, an advertisement, one or more user preferences, data for updating at least one of software or firmware and so on.

At 812, the device 102 may configure the device 102 based on the configuration information. For example, the device 102 may store a wireless access point setting, store an icon related to a media content item that is associated with a user, update software and/or firmware of the device 102 and so on.

At 814, the device 106 may perform processing based on the configuring operation 812. For example, the device 102 may cause display of an icon to enable a media content item to be viewed on the device 102, connect to a wireless access point based on a newly set wireless access point setting and so on.

FIG. 9 illustrates the example process 900 to cause a device to be temporarily powered while located within a shipping package to store data for the automatic configuration of the device.

At 902, the computing device 114 of the fulfillment center 108 may cause the package 122 to be positioned within a predetermined distance to the induction power source 126. At this point, the device 102 may have already been moved from a storage location and positioned in the package 122 on the conveyor system 118. The package 122 may move along the conveyor system 118 until it is located within a predetermined distance to the induction power source 126 (e.g., so that the induction coil 124 in the package 122 is aligned with an induction coil in the induction power source 126). In some instances, the induction coil 124 may be arranged in a package, while in other instances the induction coil 124 may be disposed on or within the device 102.

At 904, the computing device 114 may receive data from the scanner 120. Here, the package 122 and/or the device 102 within the package 122 may be scanned. In some instances, the package 122 remains open so that the device 102 may be scanned. Further, in some instances both the package 122 and the device 102 (e.g., markers on the shipping package and the device 102) are scanned so that the device 102 may be associated with the package 122.

At 906, the computing device 114 may identify a user to which the device 102 is to be shipped (e.g., the user 106). This may include using the data from the scanner 120 to identify shipping information for the package 122.

At 908, the computing device 114 may identify data that is associated with the user 106. In some instances, this may include sending identifying information of the user 106 (e.g., a name, email address, etc.) to the service provider 108 and receiving content from the service provider 108 that has been associated with the user 106. In other instances, this may include identifying a unique identifier for the user 106.

Although the operations 904-908 are illustrated in FIG. 9 as occurring after the operation 902, in some instances one or more of the operations 904-908 are performed before the package 122 is positioned in proximity to the induction power source 126.

At 910, the computing device 114 may cause the induction power source 126 to temporarily power the device 102 in the package 122 via induction. This may include sending a signal to the induction power source 126 to cause an electrical current to flow through an induction coil within the induction power source 126.

At 912, the data may be provided to the device 102 for the automatic configuration of the device 102. The data may be provided while the device 102 is temporarily powered. In some instances, the data includes a unique identifier that is associated with the user 106. In other instances, the data includes content that is associated with the user 106, such as videos, images, settings, photographs, applications, user preferences, other media content and so on. The operation 912 may be performed by the computing device 114, the wireless access point 128, and/or the service provider 108. As such, the operation 912 is illustrated in a dotted line.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A package comprising:
   packaging having a first portion and a second portion distinct from the first portion, the first portion of the packaging including an induction coil connected to a port of an electronic device, and the second portion of packaging including the electronic device; and
   the electronic device having one or more processors and memory, the electronic device being configured to:
   power-on based at least in part on a current induced in the induction coil;
   automatically connect to a wireless access point;

receive, from a service provider via the wireless access point, content for a user that is associated with the electronic device; and configure the electronic device with the content.

2. The package of claim 1, wherein the first portion of the packaging arranges the induction coil within a predetermined distance to an outer surface of the package.

3. The package of claim 1, wherein the electronic device is configured to receive the content via the wireless access point that is located in a fulfillment center.

4. The package of claim 1, wherein the electronic device is configured to send a unique identifier that is associated with the user to the service provider to cause the electronic device to be associated with a user account of the user.

5. The package of claim 1, wherein the content comprises at least one of:
a setting for a wireless network that is associated with the user;
an icon that represents a media content item or a portion of the media content item;
an advertisement;
one or more user preferences; or
data for updating at least one of software or firmware of the electronic device.

6. The package of claim 1, wherein:
the content comprises an icon that represents a media content item that is associated with the user; and
the electronic device is further configured to:
cause display of the icon to enable the media content item to be viewed on the electronic device; and
in response to receiving user input that selects the icon, cause presentation of at least a portion of the media content item on the electronic device.

7. The package of claim 1, wherein the electronic device comprises a non-battery powered device.

8. A system comprising:
the package of claim 1;
a conveyor system including an induction power source, the conveyor system being configured to position the package within a predetermined distance to the induction power source; and
one or more fulfillment center computing devices configured to:
receive scan data regarding information on the package;
determine that the package will be shipped to the user based at least in part on the scan data; and
cause the content to be sent from the service provider to the electronic device.

9. A method comprising:
receiving, via an induction coil connected to a port of an electronic device, power from an induction power source included within a conveyor system, the receiving occurring while a package that includes the induction coil and has the electronic device disposed therein is positioned on the conveyor system within a predetermined distance to the induction power source;
in response to receiving power via the induction coil, powering-on at least a processing unit of the electronic device;
in response to the processing unit of the electronic device powering-on, automatically connecting to a wireless access point;
transmitting a request for configuration information to a service provider;
in response to the request, receiving the configuration information; and configuring the electronic device based at least in part on the configuration information.

10. The method of claim 9, wherein the configuration information comprises at least one of:
a setting for a wireless network;
an icon that represents a media content item or a portion of a media content item;
an advertisement;
one or more user preferences; or
data for updating at least one of software or firmware of the electronic device.

11. The method of claim 9, wherein the induction coil is formed as a label.

12. The method of claim 9, wherein the configuring comprises configuring the electronic device at a fulfillment center.

13. The method of claim 9, wherein the electronic device comprises a non-battery powered device.

14. A package comprising:
packaging including an induction coil connected to a port of an electronic device and including the electronic device; and
the electronic device having one or more processors and memory, the electronic device being configured to:
power-on based at least in part on a current induced in the induction coil;
connect to a wireless access point located in a fulfillment center;
receive, from a service provider via the wireless access point, content for a user that is associated with the electronic device; and
configure the electronic device with the content.

15. The package of claim 14, wherein the packaging arranges the induction coil within a predetermined distance to an outer surface of the package.

16. The package of claim 14, wherein the content comprises a password for a wireless network of a user that is associated with the electronic device.

17. The package of claim 14, wherein the content comprises at least one of:
an icon that represents a media content item or a portion of the media content item;
an advertisement;
one or more user preferences; or
data for updating at least one of software or firmware of the electronic device.

18. The package of claim 14, wherein the electronic device comprises a non-battery powered device.

19. The package of claim 14, further comprising:
a marking disposed on an exterior surface of the package to indicate where the induction coil is located within the package.

20. A system comprising:
the package of claim 14;
a conveyor system including an induction power source, the conveyor system being configured to position the package within a predetermined distance to the induction power source; and
one or more fulfillment center computing devices configured to:
receive scan data regarding information on the package;
determine that the package will be shipped to the user based at least in part on the scan data; and cause the content to be sent from the service provider to the electronic device.

\* \* \* \* \*